United States Patent Office 2,770,922
Patented Nov. 20, 1956

2,770,922
RADIATION COLORABLE CHROMIUM GLASS

John V. Fitzgerald and George S. Bachman, New Kensington, Pa., assignors to Pittsburgh Plate Glass Company No Drawing. Application May 19, 1952,
Serial No. 288,748

10 Claims. (Cl. 49—88)

This invention relates to glass that exhibits a color change when exposed to high energy radiation. More particularly, it relates to such radiation-responsive glasses that have improved resistance to fading.

Radiation-responsive glasses have been used to measure X-rays, beta rays, gamma rays, and other high energy radiation by noting the color change produced in the glass. Several compositions of such glasses are described for example in the copending patent application of Kenneth B. McAlpine and Dale W. Rinehart, Serial No. 256,384, filed November 14, 1951, which is in common ownership with the present application.

The color imparted to these glasses, however, tends to fade. Some compositions of glass fade quite rapidly at first and then more slowly, other glasses will fade relatively rapidly and return almost to their original color. The present invention is directed to the inclusion of chromium oxide in glasses which are colorable by high energy radiation to increase their resistance to fading which would otherwise be induced by exposure to visible and ultraviolet light.

The change induced in glasses of this type by exposure to high energy radiation may be an actual color change or it may be a darkening resulting in lower light transmission. Both effects are referred to herein as a color change: glass that is colorable by high energy radiation is intended to include glass which changes color or which decreases in light transmissibility.

Ordinary lime-soda-silicate glass turns brown when exposed to X-rays, beta rays, gamma rays, or other comparable high energy radiation. This glass will fade gradually when exposed to ordinary daylight and will bleach rapidly substantially to its original color when exposed to ultraviolet light. However, if chromium oxide ($Cr_2O_3$) is added to the glass formulation in a proportion of 0.02 to 2.0 percent by weight, the resistance to fading is increased.

The following glass formulations, in which the parts are indicated by weight, were prepared experimentally:

Glass No. 1: Parts
$SiO_2$ _____ 60
$Na_2O$ _____ 20
$CaO$ _____ 20

Glass No. 2: Parts
$SiO_2$ _____ 60
$Na_2O$ _____ 20
$CaO$ _____ 20
$Cr_2O_3$ _____ 0.2

Glass No. 3: Parts
$SiO_2$ _____ 60
$Na_2O$ _____ 20
$CaO$ _____ 20
$Cr_2O_3$ _____ 0.5

Glass No. 4: Parts
$SiO_2$ _____ 60
$Na_2O$ _____ 20
$CaO$ _____ 20
$Cr_2O_3$ _____ 1.0

These four glasses were then exposed to 100,000 roentgens of X-rays generated at 250 kilovolts. All of the glasses turned a deep brown in color. These colored glass samples were then exposed for 100 hours to the rays of a 200-volt Cooper-Hewitt Uviarc ultraviolet lamp operated in accordance with the safety code specifications No. 5.1.22 of the American Standards Association. The glasses were then examined for fading with the following results:

| Glass No. | Fading |
|---|---|
| 1 | Faded substantially to its original color. |
| 2 | Slight fading. |
| 3 | Trace of fading. |
| 4 | None to slight trace of fading. |

Various theories underlying the invention have been considered by applicants, but it is not known with certainty exactly what causes the increased resistance to fading. One possible explanation is that the radiation-produced coloration in lime-soda glass is due to the formation therein of color centers or trapped electrons which are released readily with bleaching upon exposure to visible or ultraviolet light. The added chromium oxide does not inhibit the radiation coloration but may absorb or filter the visible and ultraviolet light so as to prevent its bleaching action. Another possibility is that the high energy radiation results in a photochemical change in the chromium-containing glass that makes the glass more resistant to fading.

The glass composition is subject to wide variation and may include by weight between 40 and 80 percent of $SiO_2$, about 20 to 60 percent of alkaline oxide, such as sodium oxide, potassium oxide, barium oxide, calcium oxide, strontium oxide, or combinations thereof, and between 0.02 and 2.0 percent chromium oxide.

Glass formulations having a decreased rate of fading can be produced by adding between 0.02 and 2.0 percent $Cr_2O_3$ to any of the compositions for radiation-sensitive glass set forth in the above-identified copending application of McAlpine and Rinehart.

It is also apparent that significant quantities of materials that render the glass resistant to coloration should be excluded. The effects of a number of such materials including cerium oxide, iron oxide, titanium oxide, antimony oxide, vanadium pentoxide, bismuth tri-oxide, and arsenic oxide, are described in the above-identified copending application.

The glasses described herein may be used to measure high energy radiation or glasses may be colored in this manner for use in other devices. For example, in applications where it is desired to provide a single glass member having different light-transmission density in different areas, radiation-colorable, fade-resistant glass may be exposed to high energy radiation to produce uniform coloration of a desired depth. Any desired portions of the glass may then be masked by material that will shield the glass from the high energy radiation and the radiation continued on the exposed portions of the glass to produce therein a deeper coloration. Gradually changing color density can be obtained by gradually moving the mask across the glass during radiation. This process may be used, for example, to make sun glasses having gradually changing light transmissibility across the lens.

The exact amount of $Cr_2O_3$ to be used will depend upon the glass composition and the resistance to fading that is desired for the particular application. The amount of $Cr_2O_3$ ordinarily to be used will be between 0.02 and 2.0 percent by weight. With most glass formulations, chromium oxide in amounts less than 0.02 percent does not produce significant increase in resistance to fading. For most glasses and applications, about one percent of chromium oxide is satisfactory. Above two percent, no significant improvement is obtained but the coloration imparted to the glass by the chromium oxide itself is undesirable.

We claim:

1. A fade-resistant glass consisting essentially of a glass colorable by high energy radiation containing between 0.02 and 2.0 percent by weight of chromium oxide, said glass being substantially free from substances that inhibit coloration of the glass by high energy radiation.

2. A glass as claimed in claim 1 wherein the glass is a lime-soda-silicate glass.

3. A glass as claimed in claim 1 wherein the chromium oxide comprises about one percent by weight of the glass.

4. A glass composition consisting essentially of about 60 parts by weight of $SiO_2$; about 20 parts by weight of $Na_2O$; about 20 parts by weight of CaO; and between 0.02 and 2.0 parts by weight of chromium oxide.

5. The method of making fade-resistant colored glass comprising the steps of forming a radiation-colorable glass substantially free from substances that inhibit coloration of the glass by high energy radiation and containing between 0.02 and 2.0 percent chromium oxide, and exposing said glass to high energy radiation sufficient to produce significant coloration thereof.

6. The method as claimed in claim 5 wherein different parts of said glass are exposed to different amounts of high energy radiation to produce different densities of coloration in the different parts of the glass.

7. The method as claimed in claim 5 wherein the high energy radiation is X-ray radiation.

8. The method as claimed in claim 5 wherein said glass includes about one percent of chromium oxide.

9. A glass composition consisting by weight of about 40 to 80 percent of $SiO_2$; about 20 to 60 percent of alkaline oxide selected from the group consisting of sodium oxide, potassium oxide, barium oxide, calcium oxide, strontium oxide, and mixtures thereof; and between 0.02 and 2.0 percent of $Cr_2O_3$; said composition being free of significant amounts of poisons that substantially reduce coloration of the glass by high-energy radiation.

10. A glass composition as claimed in claim 9 wherein $SiO_2$ forms about 60 percent of said glass, alkaline oxide forms about 40 percent of said glass, and $Cr_2O_3$ forms about one percent of said glass.

References Cited in the file of this patent

UNITED STATES PATENTS

| | | |
|---|---|---|
| 1,169,571 | Rosenthal | Jan. 25, 1916 |
| 2,515,942 | Stookey | July 18, 1950 |
| 2,581,440 | Pincus | Jan. 8, 1952 |
| 2,599,349 | Ricker | June 3, 1952 |

FOREIGN PATENTS

| | | |
|---|---|---|
| 570,946 | Great Britain | 1945 |

OTHER REFERENCES

Glass The Miracle Maker by Phillips, 2nd ed., published by Pitman Publishing Corp., New York, 1948, page 43, Example 14.